Patented Nov. 30, 1937

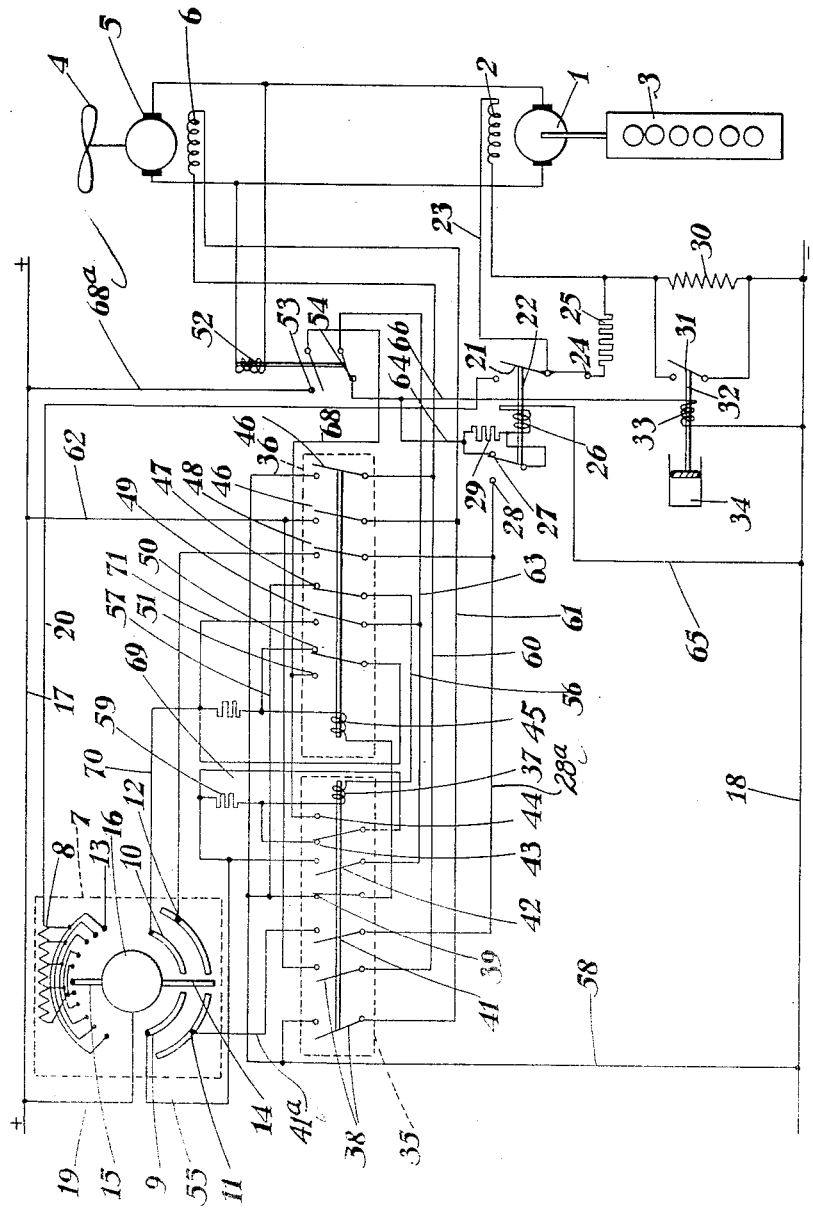

2,100,839

UNITED STATES PATENT OFFICE 2,100,839

ELECTRIC SHIP PROPULSION SYSTEM

George Ellis, Sudbury, England, assignor to The General Electric Company Limited, London, England Application June 18, 1935, Serial No. 27,205
In Great Britain June 18, 1934

7 Claims. (Cl. 172—8)

This invention relates to electric ship propulsion systems of the kind in which a direct current generator is adapted to supply power to a propulsion motor, the speed whereof is controlled by variation of the generator excitation, and in which reversal of the motor is effected by reversal of the field of one of the dynamo-electric machines, and is directed towards the provision of control arrangements whereby reversal may be rapidly but safely effected. In ship propulsion systems of the kind mentioned, if field reversal takes place before the direction of rotation of the motor has been reversed, the electro-motive forces generated by the motor and generator act in the same sense, and if under such circumstances the generator is fully excited while the motor is generating a substantial voltage, an undesirably large current flows in the motor circuit. This difficulty may be avoided by allowing ample time between movement of the speed controller to the off position and movement of the controller from the off position to the full on position, either by maintaining it for a period in the off position or by moving it slowly from the off position through its intermediate positions to the full on position. If the first method is employed the generator becomes effective later than need be since the said period must allow the voltage generated by the motor to become sufficiently small that the said voltage and the full generator voltage will not together produce too great a current in the motor circuit, whilst if the second method is employed, unless the most severe reversing conditions are taken into consideration in determining the speed of movement of the controller, an overload current is still liable to occur, but then the rate at which reversal is effected under more favourable conditions when the controller is moved at the said speed is unnecessarily slow. An object of the present invention is to provide a method of control whereby under various conditions of operation reversal may be effected safely but relatively quickly.

In an electric ship propulsion system in which a direct current generator is adapted to supply power to a propulsion motor, the speed whereof is controlled by variation of the generator excitation, and in which reversal of the motor is effected by reversal of the field of one of the dynamo-electric machines, according to the present invention control means are so arranged that during reversal the generator may be excited while the electro-motive forces of the motor and generator act in the same direction, whilst means are provided that during reversal are effective to limit the generator field strength until the voltage generated by the motor is such that the generator field may be given its full value without undesirably large currents flowing in the motor circuit.

One arrangement in accordance with the invention comprises a direct current electric motor, reversing means for controlling the sense in which the motor-field is excited, an electric generator and a speed controller for varying the generator excitation, together with means adapted during reversal of the motor to effect suitable limitation of the generator field strength while the voltage generated by the motor is such that the full generator field strength would result in undesirably large current flow in the motor circuit.

Preferably the generator excitation is removed during reversal, and interlock means are provided whereby the generator excitation can be restored only when the voltage generated by the motor is below a predetermined value.

Thus conveniently interlocking means may be provided whereby the reversing means can be operated only when the voltage generated by the motor is below a predetermined value, whilst the generator excitation, which is removed during reversal can be restored only when the reversing means has operated.

The interlocking means may comprise a voltage relay responsive to motor voltage or a device influenced in dependence on the motor speed, which allows operation of the reversing means only when the voltage generated by the motor is below the said value.

In an arrangement in accordance with the invention, the means for effecting limitation of the generator field strength may comprise a time delay device, which allows the full generator field strength to be attained only after an interval of time has elapsed after operation of the reversing means.

The generator field strength may be limited by the insertion of resistance in series with a field winding or by switching means adapted momentively to effect interruption of the circuit of a field winding of the generator.

Alternatively, a current relay may be adapted to effect opening of the circuit of a generator field winding when the current in the motor circuit exceeds a predetermined value, the circuit being reclosed when the current has fallen to a suitable value.

In a preferred embodiment of the invention, it is arranged that the means effecting limitation of the generator field strength are only operative when the controller is turned to one of its higher speed positions.

One arrangement in accordance with the invention, will now be described by way of example with reference to the accompanying diagrammatic drawing which shows the schematic generator, motor and control circuits in an electric ship propulsion system comprising a direct current generator adapted to be driven by an internal combustion engine and supplying current to a motor driving the single screw of the vessel.

In the drawing, a direct current generator having an armature 1 and a separately excited field winding 2 is driven by an internal combustion engine 3, for example of the Diesel type and supplies current to a motor driving the screw 4 and having an armature 5 and a separately excited field winding 6.

Generally, the control over the speed of rotation of the motor 5 is exerted by control of the generator output, by variation of the excitation of the generator field 2, whilst the control over the direction of rotation of the motor 5 is varied by variation of the direction of flow of current through the motor field 6.

A common speed and direction controller 7 is provided which is in the form of a ship's telegraph and comprises a pivoted handle movable in one or other direction from an "off" position, the direction and speed being respectively determined by the direction and value of the movement of the lever from the central "off" position.

The controller 7 comprises a tapped resistance 8 and two pairs of symmetrically disposed contact segments 9, 10, 11, 12, and a symmetrically disposed series of contact studs 13 connected in pairs about the central stud, to the tappings on the resistance 8.

The movement of the control handle, not shown, is arranged to effect movement of a brush 14 connected to a centre conducting segment 16 over one or other segment pair 10 and 12, or 9 and 11, and movement of a second brush 15, also connected to the centre contact segment 16, over the studs 13.

The resistance 8 is connected in a circuit extending from the positive auxiliary supply busbar 17 over line 19, contact 16, contact arm 15, one of the studs 13, line 20, contacts 21 of generator field contactor 22, line 23, generator field 2 to the negative auxiliary supply busbar 18. Variation of the position of brush 15 on the tappings on the resistance 8 thus effects variation of the excitation of the generator field 2.

The generator field contactor 22 comprises in addition normally closed contacts 24, which connect a discharge resistance 25 across the generator field 2, an operating winding 26 and normally closed auxiliary contacts 27 and normally open auxiliary contacts 28. The contacts 27 when open operate to insert an economy resistance 29 in series with the operating winding 26 of the contactor.

A resistance 30 is arranged to be connected in series with the field winding 2 under the control of contacts 31 of a time delay relay 32 having an operating coil 33 and comprising time delay means 34, shown diagrammatically as a fluid dash-pot arrangement. The relay 32 is such that when deenergized its contacts immediately open, but cannot be reclosed until after the elapse of a time-delay.

Direction control for the motor 5 is, as previously stated, exerted by control of the excitation of the motor field 6. For this purpose, an "ahead" contactor 35 and an "astern" contactor 36 are provided.

The "ahead" contactor 35 comprises an operating winding 37, normally open main contacts 38, normally closed interlock contacts 39, normally open auxiliary contacts 41 and 42 and changeover contacts 43, 44, of which contacts 43 are normally closed and contacts 44 are normally open.

In a similar manner, the "astern" contactor 36 comprises an operating winding 45, normally open main contacts 46, normally closed interlock contacts 47, normally open auxiliary contacts 48 and 49, and changeover contacts 50, 51 of which contacts 51 are normally open and contacts 50 normally closed.

The means in accordance with the invention which are adapted during reversal of the motor to effect suitable limitation of the generator field strength while the voltage generated by the motor is such that the full generator field strength would result in an undesirably large current flow in the motor circuit, are constituted by a voltage relay having an operating winding 52 connected across the motor armature 5 and normally open contacts 53 and normally closed contacts 54.

In order that the invention may more clearly be understood, there will now be described the detailed operation of the system shown in the drawing, it being assumed initially that all the switches are in the position corresponding to the "off" position of the controller but that the auxiliary supply busbars 17 and 18 are energized and that the prime mover 3 has been run up to its normal operating speed.

Suppose now that the handle of the control unit 7 is moved to the "full ahead" position.

The contact arm 14 then connects both segments 9 and 11 to the central segment 16. Accordingly a circuit is then completed from busbar 17 over the line 19, segment 16, contact arm 14, segment 9, line 55, line 69, contacts 43, operating winding 37, line 56, interlock contacts 47 of astern contactor 36, line 57, and line 58 to the negative supply busbar 18.

The "ahead" contactor 35 thereupon closes and in closing inserts an economy resistance 59 into the circuit of its operating winding 37 owing to the opening of the contact 43.

Upon the closure of the "ahead" contactor 35 the motor field 6 is energized over the lines 60, 61, contacts 38 and lines 58 and 62, from the auxiliary supply busbars 17 and 18.

At the same time, a circuit is completed from the auxiliary supply busbar 17, over line 19, segment 16, contact arm 14, segment 9, line 55, contact 42, line 63, contact 54 of the voltage relay having its winding 52 connected across the motor armature 5, line 64, contact 27, coil 26 of the generator field contactor and line 65 to the negative auxiliary supply busbar 18. Simultaneously, there is a parallel circuit completed from the contacts 54 over line 66 and winding 33 of the time delay relay 32 to the negative auxiliary supply busbar 18.

Accordingly the generator field contactor 22 closes and the generator field 2 is excited by the circuit from busbar 17 through line 19, segment 16, arm 15, tapped resistance 8, line 20, contacts 21, line 23, field coil 2, resistance 30 to busbar 18, and, since the relay 32 eventually closes after the elapse of a predetermined time, determined by the time delay relay means 34, the field 2 is excited to the maximum degree as the resistance 30 is short-circuited. The generator voltage accordingly builds up and the motor 5 commences to rotate.

The closing of the generator field contactor 22 causes a maintenance circuit therefor and for the time delay relay 32 to be set up at contacts 28, from the positive auxiliary supply busbar 17, through line 19, segment 16, brush 14, segment 11, line 41a, contacts 41 of the "ahead" direction contactor 35 and line 28a.

In due course, the generator voltage and hence the voltage across the motor armature 5 builds up to such a value that the voltage relay operates to open its contacts 54 and to close its contacts 53. A retaining circuit is thereupon set up for the "ahead" direction contactor 35 from busbar 17 over the line 68a, contacts 53, line 68, contacts 44 of the "ahead" direction contactor 35, line 69, economy resistance 59, operating winding 37, line 56, interlock contacts 47 of the astern direction contactor 36 and line 57—58 to the negative auxiliary supply busbar 18.

The maintenance of the "ahead" direction control contactor 35 is thereby rendered independent of the controller 7 and dependent on the voltage relay 52—54.

Thereafter, of course, speed control of the motor is effected by variation of the position of the controller in the ahead position, thus effecting variation of the generator field resistance 8.

Suppose now the controller 7 is moved from an "ahead" position to the "full astern" position. The initial movement to the "off position" reduces the generator field excitation, by increasing the value of resistance 8 in series with the generator field 2. As the controller is moved to the off-position the contact arm 14 disengages the segment 11 and accordingly the maintenance circuit for the generator field contactor and the time delay relay 32 are both broken. Both these contactors thereupon open.

The motor 5 is however driven by the way of the ship, and accordingly the motor 5 generates a voltage which holds up the relay having winding 52. When the said voltage has fallen to a predetermined low value, the said relay operates to open its contacts 53 and close its contacts 54.

The opening of the contacts 53 breaks the maintenance circuit for the "ahead" direction contactor 35 which thereupon opens. The controller 7 being then in the full astern position, the "astern" direction contactor 36 is then closed since its operating winding is energized by a circuit completed at contact segment 10, over line 70, winding 45, interlock contacts 39 of "ahead" direction contactor 35 and line 58 between the positive and negative auxiliary supply busbars 17 and 18.

When the "astern" direction contactor 36 has closed, a circuit is completed at contact 49 over line 71 and 63 for the generator field contactor 22 and the time delay relay means 32.

The generator field contactor 22 closes immediately but for a time determined by the time delay relay means, the generator field excitation is maintained at a low value by the inclusion of the resistance 30 in series therewith. Eventually the generator field excitation is brought up to its full value. Thereafter maintenance circuits similar to those previously described are set up.

It will be understood that the operation if the controller 7 is moved from the full "astern" to the full "ahead" is similar to that previously described.

Various modifications and adaptations of the invention may be made by the substitution of known devices for the controls described, for operation in a known manner without departing from the scope of the invention.

I claim:—

1. An electric ship propulsion system comprising a direct current generator in closed circuit with a propulsion motor, field coils for the generator and motor respectively, circuits and an independent current source for energizing said field coils, a controller having an off position and ahead and astern positions, ahead and astern direction contactors controlled by said controller and having contacts for closing the circuit of the motor field coil, the direction contactor operated determining the direction of flow of current in the motor field coil, which in turn determines the direction of rotation of the motor, a field contactor arranged to be operated by said direction contactors for closing the energizing circuit of the generator field coil, a holding circuit for said field contactor completed by the controller so that the generator field coil may be deenergized when the controller is brought to its off position and a voltage relay connected across said generator-motor circuit and controlling a holding circuit for the direction contactors preventing reversal operation thereof until the voltage in the generator motor circuit drops below a prearranged minimum.

2. An electric ship propulsion system as in claim 1, wherein a resistance arranged in series with the generator field coil is adapted to be short circuited by a delay relay at a prearranged time after operation of said generator field contactor.

3. An electric ship propulsion system as in claim 1 wherein a tapped resistance cooperating with a contact arm of said controller is arranged in circuit with the generator-field coil for controlling the energizing current therefor and to thereby regulate the speed of the motor.

4. An electric ship propulsion system comprising a direct current generator in closed circuit with a propulsion motor, field coils for the generator and motor respectively, circuits from an independent source for energizing said field coils, ahead and astern direction contactors for closing the circuit of and determining the direction of flow of current in the motor field coil and thereby determining the direction of rotation of the motor, circuits and operating coils for the respective direction contactors so arranged that only one contactor can be operated at a time, relay means controlled by said direction contactors for closing the circuit of the generator field coil, the current through the latter being in the same direction upon operation of either contactor, and a voltage relay arrangement to be operated from the generator-motor circuit for preventing deenergization of the operating coil of a direction contactor for reversal operation of said contactors until the voltage in said generator-motor circuit drops below a prearranged minimum.

5. An electric ship propulsion system as in claim 4 wherein said voltage relay is provided with contacts for completing an operating circuit through said relay means for closing the circuit of the generator field coil before the voltage rises sufficiently for operation of said voltage relay, the latter being provided with contacts for completing a holding circuit through the operating coil of an operated direction contactor after said voltage relay is operated, the holding circuit contacts not being opened after being closed until the voltage drops below said prearranged minimum.

6. An electric ship propulsion system comprising a direct current generator in closed circuit with a propulsion motor, field coils for the generator and motor respectively, contactors and circuits for directing an energizing current through the motor field coil in one direction for ahead and the other direction for astern rotation of the motor, contact means associated with said contactors for establishing a circuit for energizing the field coil of the generator by current flowing in the same direction for both ahead and astern rotation of the motor, a controller for operating said contactors for direct and reverse rotation of the motor, means operated by the controller for interrupting the last named circuit for deenergizing said generator field coil in advance of operation of said contactors when the controller is operated for reversing the current in the motor field coil and a voltage relay operated by said generator-motor circuit for preventing operation of said contactors for effecting reversal of the current in the motor field coil until the voltage in the generator-motor circuit drops below a prearranged minimum.

7. An electric ship propulsion system comprising a direct current generator in closed circuit with a propulsion motor, field coils for the generator and motor respectively, a controller, contactors arranged to be operated by the controller for directing an energizing current through the motor field coil in one direction for ahead and the other direction for astern rotation of the motor, contacts operated by the respective contactors for establishing a circuit for energizing the field coil of the generator by current flowing in the same direction for both ahead and astern rotation of the motor, controller operated means for deenergizing the generator field coil in advance of operation of said contactors for effecting a reversal of the current in the motor field coil and a voltage relay operated by said generator-motor circuit for preventing operation of said contactors for effecting reversal of the current in the motor field coil until the voltage in the generator-motor circuit drops below a prearranged minimum.

GEORGE ELLIS.